United States Patent
Xu et al.

(10) Patent No.: US 11,261,506 B2
(45) Date of Patent: Mar. 1, 2022

(54) ALLOY FOR A FIBRE-FORMING PLATE

(71) Applicant: SAINT-GOBAIN SEVA, Chalon sur Saone (FR)

(72) Inventors: Yaxin Xu, Tsukuba (JP); JingBo Yan, Tsukuba (JP); Fei Sun, Tsukuba (JP); Yuefeng Gu, Tsukuba (JP)

(73) Assignee: SAINT-GOBAIN SEVA, Chalon sur Saone (FR)

( * ) Notice: Subject to any disclaimer, the term of this patent is extended or adjusted under 35 U.S.C. 154(b) by 124 days.

(21) Appl. No.: 16/485,979

(22) PCT Filed: Feb. 28, 2017

(86) PCT No.: PCT/FR2017/050449
§ 371 (c)(1),
(2) Date: Aug. 14, 2019

(87) PCT Pub. No.: WO2018/158509
PCT Pub. Date: Sep. 7, 2018

(65) Prior Publication Data
US 2020/0063239 A1    Feb. 27, 2020

(51) Int. Cl.
*C22C 19/05* (2006.01)
*C03B 37/04* (2006.01)
*C22F 1/10* (2006.01)

(52) U.S. Cl.
CPC .......... *C22C 19/055* (2013.01); *C03B 37/047* (2013.01); *C22F 1/10* (2013.01)

(58) Field of Classification Search
CPC ........ C22C 19/055; C22C 19/053; C22F 1/10
See application file for complete search history.

(56) References Cited

U.S. PATENT DOCUMENTS

| | | | |
|---|---|---|---|
| 3,318,694 A * | 5/1967 | Heitmann | C03B 37/047 65/515 |
| 4,203,745 A | 5/1980 | Battigelli et al. | |
| 4,203,746 A | 5/1980 | Battigelli et al. | |
| 4,203,747 A | 5/1980 | Fezenko | |
| 4,203,748 A | 5/1980 | Battigelli et al. | |
| 4,203,774 A | 5/1980 | Battigelli et al. | |
| 4,288,236 A | 9/1981 | Battigelli et al. | |
| 4,288,237 A | 9/1981 | Battigelli et al. | |
| 4,289,518 A | 9/1981 | Battigelli et al. | |
| 4,662,920 A * | 5/1987 | Coupland | C22C 19/058 148/410 |
| 4,708,848 A * | 11/1987 | Lewis | C22C 19/055 420/585 |
| 6,266,979 B1 | 7/2001 | Johnson et al. | |
| 2004/0050114 A1 | 3/2004 | Berthod et al. | |
| 2007/0107811 A1 | 5/2007 | Bernard et al. | |
| 2007/0292303 A1 | 12/2007 | Berthod et al. | |
| 2010/0024431 A1 | 9/2010 | Bernard et al. | |
| 2014/0205802 A1* | 7/2014 | Enjo | C22C 19/052 428/141 |

FOREIGN PATENT DOCUMENTS

| | | |
|---|---|---|
| CN | 1195031 A | 10/1998 |
| CN | 106244856 A | 12/2016 |
| FR | 1.040.231 A | 10/1953 |
| FR | 2 675 818 A1 | 10/1992 |
| JP | 62-207836 A | 9/1987 |
| JP | 8-290933 A | 11/1996 |
| JP | 2003-277889 A | 10/2003 |
| JP | 2004-99968 A | 4/2004 |

OTHER PUBLICATIONS

International Search Report dated Jul. 20, 2017 in corresponding PCT Application No. PCT/FR2017/050449 filed Feb. 28, 2017, 6 pages.

* cited by examiner

*Primary Examiner* — Jessee R Roe
(74) *Attorney, Agent, or Firm* — Oblon, McClelland, Maier & Neustadt, L.L.P.

(57) ABSTRACT

A metal alloy is for use at very high temperature, in particular the metal alloy can be used in a process for the manufacture of mineral wool by fiberizing a molten mineral composition. The metal alloy contains the following elements, the proportions being shown as percentage by weight of the alloy:

| | |
|---|---|
| Cr | 20 to 35% |
| Fe | 10 to 25% |
| W | 2 to 10% |
| Nb | 0.5 to 2.5% |
| Ti | 0 to 1% |
| C | 0.2 to 1.2% |
| Co | less than 5% |
| Si | less than 0.9% |
| Mn | less than 0.9% | the remainder consisting of nickel and unavoidable impurities.

20 Claims, 1 Drawing Sheet

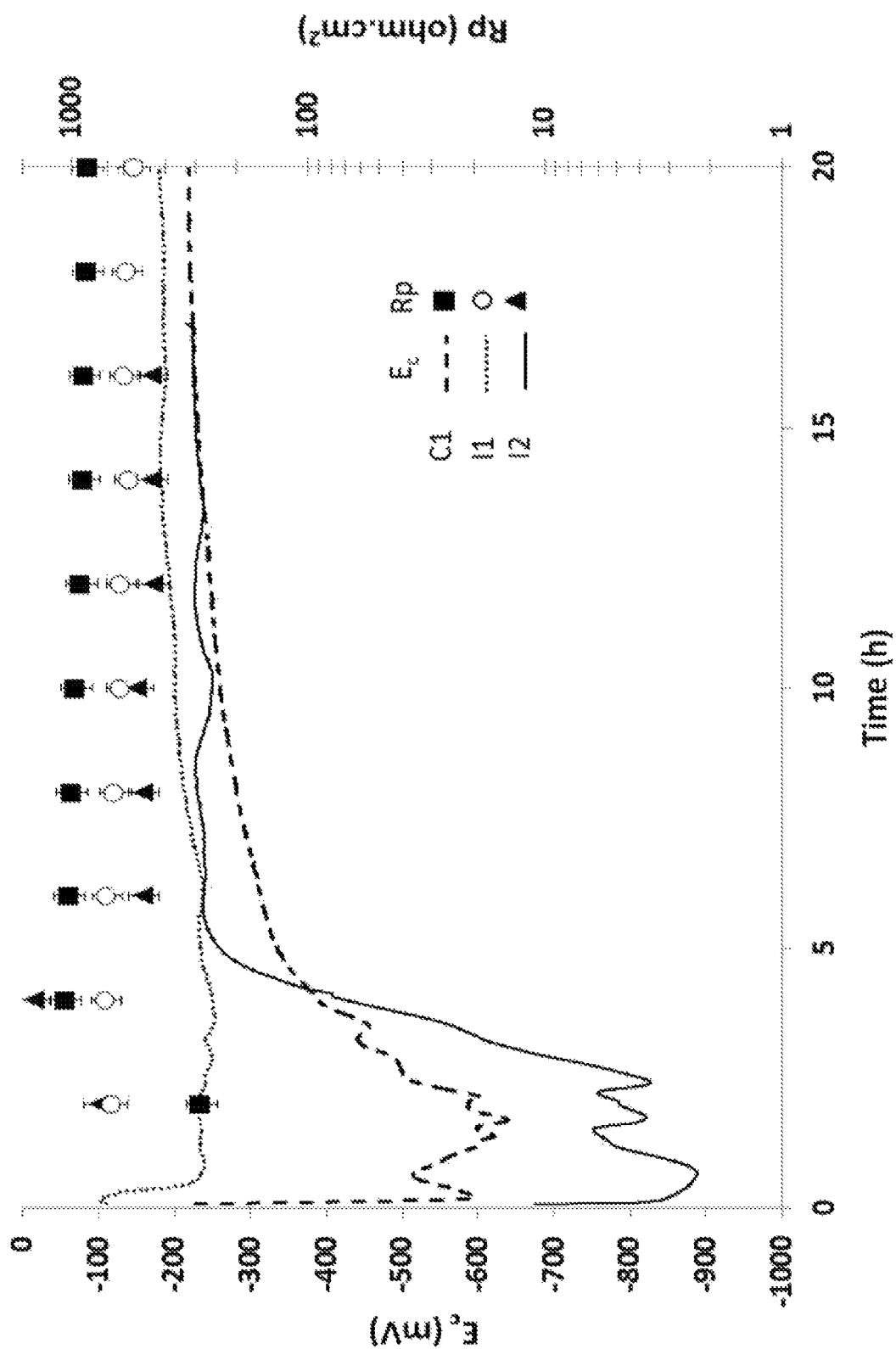

ALLOY FOR A FIBRE-FORMING PLATE

The present invention relates to a metal alloy for use at very high temperature, in particular which can be used in a process for the manufacture of mineral wool by fiberizing a molten mineral composition, or more generally for the formation of tools endowed with high-temperature mechanical strength in an oxidizing environment, such as molten glass, and to nickel-based alloys which can be used at high temperature, in particular for the preparation of articles for the melting and/or hot conversion of glass or other mineral material, such as components of machines for the manufacture of mineral wool.

One fiberizing technique, known as by internal centrifugation, consists in allowing liquid glass to fall continuously inside an assembly of axisymmetric parts rotating at a very high rotational speed around their vertical axis. One key part, known as "spinner", receives the glass against a wall referred to as "band" pierced with holes through which the glass passes under the effect of the centrifugal force in order to escape from all parts thereof in the form of molten filaments. An annular burner located above the outside of the spinner, which produces a descending gas stream hugging the external wall of the band, deflects these filaments downward, drawing them. The filaments subsequently "solidify" in the form of glass wool.

The spinner is a fiberizing tool which is highly stressed thermally (heat shocks during startup and shutdown operations, and establishment, in stabilized use, of a temperature gradient along the part), mechanically (centrifugal force, erosion due to the passage of the glass) and chemically (oxidation and corrosion by the molten glass, and by the hot gases exiting from the burner around the spinner). Its main modes of deterioration are: hot creep deformation of the vertical walls, the appearance of horizontal or vertical cracks and wear by erosion of the fiberizing orifices, which require the replacement pure and simple of the components. Their constituent material must thus resist for a sufficiently long production time to remain compatible with the technical and economic constraints of the process. For this purpose, materials endowed with a degree of ductility, creep resistance and resistance to corrosion by molten glass and oxidation at high temperature are sought.

Nickel-based super alloys reinforced by precipitation of carbides are known for the preparation of these tools. FR 2675818 describes such alloys, for example. The present invention is targeted at providing nickel-based alloys which are further improved, in particular from the viewpoint of the resistance to creep, to corrosion and/or to oxidation. The alloys according to the invention exhibit in particular a better stability of their properties at high temperature, for example greater than 1000° C., indeed even greater than 1040° C. Another objective of the present invention is to provide alloys which are less expensive while maintaining, indeed even while improving, the abovementioned properties of the resistance to creep, to corrosion and/or to oxidation.

More specifically, a subject matter of the present invention is a nickel-based alloy, additionally comprising chromium, and carbon, which contains the following elements (the proportions being shown as percentage by weight of the alloy):

| | |
|---|---|
| Cr | 20 to 35% |
| Fe | 10 to 25% |
| W | 2 to 10% |
| Nb | 0.5 to 2.5% |
| Ti | 0 to 1% |
| C | 0.2 to 1.2% |
| Co | less than 5% |
| Si | less than 0.9% |
| Mn | less than 0.9% | the remainder consisting of nickel and unavoidable impurities.

The term "unavoidable impurities" is understood to mean, within the meaning of the present invention, that the elements concerned are not intentionally present in the composition of the alloy but that they are introduced in the form of impurities present in at least one of the main elements of the alloy (or in at least one of the precursors of said main elements).

The alloy according to the present invention differs from the nickel-based alloys generally used for such applications in particular in that it contains niobium carbides (NbC) and optionally titanium carbides (TiC), and also a high amount of iron. This combination makes it possible to obtain an alloy exhibiting a good mechanical strength, in particular a good creep strength, at high temperature while lowering the cost of the alloy.

While it is known to add a certain amount of iron to nickel-based alloys in order to improve the resistance to corrosion with regard to molten glass, it is generally considered that the addition of iron in high proportions affects their mechanical properties and the resistance to oxidation, in particular at high temperature. Unexpectedly and even contrary to what could be expected, the properties of the alloy compositions according to the present invention, that is to say exhibiting a higher proportion of iron than described above, have appeared equivalent, indeed even superior, to those of the alloys described above by virtue of the presence of niobium carbides. As iron is an inexpensive element, the use of 10%, indeed even 12% or 15%, to 25%, indeed even 23% or 20%, by weight of iron in the alloy is advantageous in reducing the cost of the final alloy, without affecting the properties of the alloy. The alloy can comprise, for example, from 12 to 25%, 15 to 25%, 10 to 23%, 12 to 23%, 15 to 23%, 10 to 20%, 12 to 20% or 15 to 20% by weight of iron.

Carbon is an essential constituent of the alloy, necessary for formation of metal carbide precipitates. In particular, the carbon content directly determines the amount of carbides present in the alloy. It is at least 0.2% by weight, in order to obtain the desired minimum reinforcement, preferably at least 0.6% by weight, but preferably limited to at most 1.2% by weight, preferably of at most 1% by weight, in order to prevent the alloy from becoming hard and difficult to machine due to an excessively high density of reinforcements. The lack of ductility of the alloy at such contents prevents it from accommodating, without fracturing, an imposed deformation (for example of thermal origin) and from being sufficiently resistant to the propagation of cracks. The alloy can, for example, comprise from 0.6 to 1.2%, 0.2 to 1% or 0.6 to 1% by weight of carbon.

In a way already described, chromium contributes to the intrinsic mechanical strength of the matrix in which it is present partly in solid solution and, in some cases, also in the form of carbides essentially of $Cr_{23}C_6$ type in fine dispersion inside the grains, where they contribute a resistance to intergranular creep, or in the form of carbides of $Cr_7C_3$ or $Cr_{23}C_6$ type present at the grain boundaries, which prevent slipping grain on grain, thus also contributing to the intergranular strengthening of the alloy. Chromium contributes to the resistance to corrosion as precursor of chromium oxide, which forms a protective layer at the surface exposed to the oxidizing environment. A minimum amount of chromium is necessary for the formation and the maintenance of this protective layer. However, an excessively high chromium content is harmful to the mechanical strength and to the toughness at high temperatures as it results in an excessively high stiffness and an excessively low elongatability under stress incompatible with high-temperature stresses. Generally, the chromium content of an alloy which can be used according to the invention is from 20%, indeed even 22% or 23%, to 35%, indeed even 30% or 28%, by weight of the alloy. The alloy can, for example, comprise from 22 to 35%, 23 to 35%, 20 to 30%, 22 to 30%, 23 to 30%, 20 to 28%, 22 to 28% or 23 to 28% by weight of chromium.

Niobium, just as titanium, contributes to the mechanical strength of the alloy, in particular to the creep strength, at high temperature, for example greater than 1000° C., indeed even greater than 1040° C. This is because chromium carbides have a tendency to dissolve at temperatures of greater than 1000° C. The presence of niobium carbides and titanium carbides, which are more stable than chromium carbides at high temperature, makes it possible to ensure the mechanical strength of the alloy at high temperature. Niobium content is generally from 0.5%, indeed even 0.7%, to 2.5%, indeed even 2.0% or even 1.7%, by weight of the alloy. The alloy can, for example, comprise from 0.7 to 2.5%, 0.5 to 2.0%, 0.7 to 2.0%, 0.5 to 1.7% or 0.7 to 1.7% by weight of niobium. The (Nb+Ti)/C ratio by weight is preferably from 1 to 2, more preferably from 1.5 to 2.

A titanium content of up to 1% by weight also contributes to the mechanical strength of the alloy at high temperature by the formation of titanium carbides. However, it has been noticed that the presence of titanium could affect the resistance to oxidation of the alloy. Thus, the titanium content is preferably less than 0.5%, indeed even of less than 0.4%, by weight. In a particularly preferred embodiment, the alloy does not comprise titanium other than in the form of unavoidable impurity, that is to say at contents of less than 0.1%, indeed even of less than 0.05% or even of less than 0.01%, by weight of the alloy. Cobalt, present in the alloy in the form of a solid solution with nickel, contributes to the resistance to corrosion and to the mechanical strength of the alloy. As cobalt is an expensive element, it is generally present in an amount of less than 5%, indeed even of less than 4% or 3%, indeed even of less than 2% or 1%, by weight of the alloy, in order not to increase the cost of the final alloy. Most generally, the tests carried out by the applicant have shown that cobalt was virtually always present in the form of unavoidable impurity at a content of at least 0.3% by weight and generally of at least 0.5% by weight, indeed even of at least 0.7% by weight. Percentages of cobalt in the alloy of less than 0.3% by weight should, however, also be regarded as within the scope of the invention.

Tungsten contributes to the hardness of the alloy and to its creep strength. It is generally present in an amount of 2%, indeed even 3% or 4%, to 10%, indeed even 9% or 6%, by weight of the alloy. The alloy can, for example, comprise from 3 to 10%, 4 to 10%, 2 to 9%, 3 to 9%, 4 to 9%, 2 to 6%, 3 to 6% or 4 to 6% by weight of tungsten.

The alloy can contain other elements in minor proportions or in the form of unavoidable impurities. It generally comprises:

silicon, as deoxidant for the molten metal during the smelting and molding of the alloy, in a proportion of less than 0.9%, indeed even of less than 0.6%, by weight;

manganese, also a deoxidant, in a proportion of less than 0.9%, indeed even of less than 0.6%, by weight;

The cumulative amount of the other elements introduced as impurities with the essential constituents of the alloy ("unavoidable impurities") advantageously represents less than 1% by weight of the composition of the alloy.

The alloys according to the invention are preferably devoid of Ce, La, B, Y, Dy, Re and other rare earth metals, apart from unavoidable impurities.

The alloy according to the present invention is also distinguished from certain nickel-based alloys generally used in the manufacture of fiberizing spinners in that it does not contain aluminum other than in the form of unavoidable impurity, that is to say at contents of less than 0.1%, indeed even of less than 0.05% or even of less than 0.01%, by weight. This is because it has been noticed that the presence of aluminum in the alloy, even at a low amount of the order of 0.1% by weight, could significantly affect its corrosion resistance with regard to the molten glass.

The alloy according to the invention is also devoid of molybdenum, apart from in the form of unavoidable impurity, that is to say at contents of less than 0.1%, indeed even of less than 0.05% or even of less than 0.01%, by weight. This is because, although molybdenum is known to provide nickel-based alloys with excellent corrosion resistance, it has been observed that, even at low contents, molybdenum could considerably affect their resistance to oxidation.

In a specific embodiment, the alloy according to the invention comprises:

| Cr | 22 to 30%, | preferably | 23 to 28% |
|---|---|---|---|
| Fe | 12 to 23%, | preferably | 15 to 20% |
| W | 3 to 9%, | preferably | 3 to 6% |
| Nb | 0.5 to 2.5%, | preferably | 0.7 to 1.7%, |
| C | 0.7 to 1% | | |
| Co | less than 5% | | |
| Si | less than 0.9% | | |
| Mn | less than 0.9% | | | and does not comprise titanium other than in the form of unavoidable impurities, the remainder consisting of nickel and unavoidable impurities.

The alloys which can be used according to the invention, which contain highly reactive elements, can be formed by founding, in particular by inductive melting under an at least partially inert atmosphere and sand mold casting.

The casting can optionally be followed by a heat treatment.

Another subject matter of the invention is a process for the manufacture of an article by founding starting from the alloys described above as subject matter of the invention.

The process generally comprises a stage of appropriate heat treatment which makes it possible to obtain secondary carbides and makes possible their homogeneous distribution in the metal matrix, as described in FR 2675818 The heat treatment is preferably carried out at a temperature of less than 1000° C., indeed even of less than 950° C., for example from 800° C. to 900° C., for a period of time of at least 5 hours, indeed even at least 8 hours, for example from 10 to 20 hours.

The process can comprise at least one cooling stage, after the casting and/or after or in the course of a heat treatment, for example by cooling in the air, in particular with a return to ambient temperature.

The alloys which are subject matter of the invention can be used to manufacture all kinds of parts which are mechanically stressed at high temperature and/or caused to operate in an oxidizing or corrosive environment. Other subject matters of the invention are such articles manufactured from an alloy according to the invention, in particular by founding.

Mention may in particular be made, among such applications, of the manufacture of articles which can be used for the melting or the hot conversion of glass, for example fiberizing spinners for the manufacture of mineral wool.

Thus, another subject matter of the invention is a process for the manufacture of mineral wool by internal centrifugation, in which a flow of molten mineral material is poured into a fiberizing spinner, the peripheral band of which is pierced with a multitude of orifices through which filaments of molten mineral material escape, which filaments are subsequently drawn to give wool under the action of a gas, the temperature of the mineral material in the spinner being at least 900° C., indeed even at least 950° C. or at least 1000° C., indeed even at least 1040° C., and the fiberizing spinner being formed of an alloy as defined above.

The alloys according to the invention thus make it possible to fiberize a molten mineral material having a liquidus temperature ($T_{liq}$) of 800° C. or more, for example of 850° C., indeed even 900° C., to 1030° C., indeed even 1000° C. or even 950° C.

Generally, the fiberizing of these mineral materials can be carried out in a range of temperatures (for the molten material arriving in the spinner) of between $T_{liq}$ and $T_{log3}$, where $T_{log3}$ is the temperature at which the molten composition exhibits a viscosity of 100 Pa·s, typically of the order of less than 1200° C., indeed even of less than 1150° C., preferably between 1020 and 1100° C., indeed even between 1050 and 1080° C. The difference between $T_{log3}$ and $T_{liq}$ is generally greater than 50° C.

The composition of the mineral material to be fiberized is not particularly limited as long as it can be fiberized by an internal centrifugation process. It can vary as a function of the properties desired for the mineral fibers produced, for example biosolubility, fire resistance or thermal insulation properties. The material to be fiberized is preferably a glass composition of soda-lime-silica-borate type. It can in particular exhibit a composition which includes the constituents below, in the proportions by weight defined by the following limits:

| | |
|---|---|
| $SiO_2$ | 35 to 80%, |
| $Al_2O_3$ | 0 to 30%, |
| CaO + MgO | 2 to 35%, |
| $Na_2O + K_2O$ | 0 to 20%, | it being understood that, in general,
$SiO_2+Al_2O_3$ is within the range extending from 50 to 80% by weight and that $Na_2O+K_2O+B_2O_3$ is within the range extending from 5 to 30% by weight.

The material to be fiberized can in particular exhibit one the following composition:

| | |
|---|---|
| $SiO_2$ | 50 to 75%, |
| $Al_2O_3$ | 0 to 8%, |
| CaO + MgO | 2 to 20%, |
| $Fe_2O_3$ | 0 to 3%, |
| $Na_2O + K_2O$ | 12 to 20%, |
| $B_2O_3$ | 2 to 10%. |

The material to be fiberized can be prepared from pure constituents but it is generally obtained by melting in a mixture of natural starting materials introducing different impurities.

Although the invention has been described mainly in the context of the manufacture of mineral wool, it can be applied to the glass industry in general for producing furnace, bushing or feeder components or fittings, in particular for the production of yarns of textile glass, of packaging glass, and the like.

Outside the glass industry, the invention can be applied to the manufacture of a very wide variety of articles, when the latter have to exhibit a high mechanical strength in an oxidizing and/or corrosive environment, in particular at high temperature.

The examples which follow, which are in no way restrictive of the compositions according to the invention or of the conditions for employing the fiberizing spinners according to the invention, illustrate the advantages of the present invention.

EXAMPLE

A molten charge of the compositions I1, I2 (according to the invention) and C1 (according to FR 2675818) which are shown in table 1 is prepared by the inductive melting technique under an inert atmosphere (in particular argon), which molten charge is subsequently formed by simple casting in a sand mold. The proportions as for the percentage by weight of each element in the alloy are shown in table 1, the remainder to 100% consisting of nickel and unavoidable impurities.

TABLE 1

| | I1 | I2 | C1 |
|---|---|---|---|
| Cr | 25 | 25 | 28.5-29.5 |
| Fe | 17 | 17 | 4-9 |
| W | 5 | 5 | 7.2-7.6 |
| Nb | 1.5 | 1 | * |
| Ti | * | 0.5 | * |
| C | 0.9 | 0.9 | 0.69-0.73 |
| Co | 3 | 3 | * |

* possibly present in the form of unavoidable impurity

The casting is followed by a heat treatment for precipitation of the secondary carbides at 865° C. for 12 hours, finishing with a cooling in air down to ambient temperature.

In this way, 150*100*25 mm ingots were manufactured.

The properties of resistance to creep, to oxidation and to corrosion of the alloys I1, I2 and C1 were subsequently evaluated.

The resistance to creep was measured by a creep-traction test on cylindrical test specimens with a diameter of 3.0 mm, with a total length of 60.0 mm and with a length of 20.0 mm between marks. The tests were carried out at 1000° C. (normal operating temperature of a spinner) and 1050° C., under loads of 31 MPa (corresponding to a normal stressing of the spinner), 63 MPa (corresponding to an extreme stressing of the spinner) and 100 MPa. Table 2 shows the time (t), in hours, and the elongation (E), as percentage, before breaking.

The resistance to oxidation depends, on the one hand, on the kinetics of oxidation of the alloy and, on the other hand, on the quality of adhesion of the oxide layer formed on the surface of the alloy. This is because poor adhesion of the oxide layer to the surface of the alloy accelerates oxidation of the latter: when the oxide layer comes off, a nonoxidized alloy surface is then exposed directly to the oxygen of the air, which brings about the formation of a new oxide layer, in its turn capable of coming off, thus propagating the oxidation. On the contrary, when the oxide layer remains adherent to the surface of the alloy, it forms a barrier layer which limits, indeed even halts, the progression of the oxidation. The oxidation rate constants, expressed in mg·cm$^{-2}$·h$^{-1/2}$, were calculated from the monitoring of increasing weight resulting from the oxidation of samples placed at 1000° C. for 50 h in a furnace equipped with a microbalance under a stream of air. To evaluate the quality of adhesion of the oxide layer, samples housed in individual crucibles were placed in a furnace at 1000° C. under a stream of air for 5, 10, 24, 36 and 50 hours respectively. The presence of powder at the bottom of the crucible indicates detachment of the oxide layer. Table 2 shows the amount of powder observed in the crucible for each of the samples (⊚: absence of powder; ○: little powder; ⊗: much powder). The greater the amount of powder, the less adherent the oxide layer.

TABLE 2

|  |  |  | I1 | I2 | C1 |
|---|---|---|---|---|---|
| Creep t(h)/E(%) | 1000° C. | 31 MPa | 1293.6/1.40 | 1310/1.50 | 567.8/5.55 |
|  |  | 63 MPa | 32.9/6.7 | 33.0/37.5 | 9.05/17.8 |
|  |  | 100 MPa | 1.57/22.8 | 0.93/48.8 | 0.5/40.9 |
|  | 1050° C. | 63 MPa | 5.78/10.7 | 4.23/37 | 1.87/33.2 |
| Oxidation | Kinetic constant |  | 0.31 | 0.42 | 0.28 |
|  | Adhesion of the oxide layer | 5 h | ⊚ | ⊚ | ⊚ |
|  |  | 10 h | ⊚ | ⊚ | ○ |
|  |  | 24 h | ⊚ | ⊚ | ○ |
|  |  | 36 h | ⊚ | ○ | ⊗ |
|  |  | 50 h | ⊚ | ○ | ⊗ |

The tests of resistance to corrosion are carried out using a three-electrode assembly, which electrodes are immersed in a rhodium/platinum crucible containing the molten glass. The rhodium/platinum crucible is used as counterelectrode. The comparison electrode is conventionally the air-fed stabilized zirconia electrode. The cylindrical samples of alloys to be evaluated, oxidized beforehand in air at 1000° C. for 2 h, are sealed with zirconia cement to an alumina sheath to form the working electrode. The sample constituting the working electrode is fitted to a rotating axis, in order to represent the frictional exertions of the glass on the surface of the alloy, and immersed in the molten glass at 1000° C. (composition as percentage by weight: $SiO_2$ 65.6; $Al_2O_3$ 1.7; $Na_2O$ 16.4; $K_2O$ 0.7; CaO 7.4; MgO 3.1; $B_2O_3$ 4.8). The resistance of the alloys to corrosion by the glass is evaluated by measuring and the polarization resistance (Rp). In order to measure the corrosion potential ($E_c$), no current is applied between the working electrode and the counterelectrode, and the potential measured between the working electrode and the comparison electrode is that of the metal/glass pair at the given temperature. This thermodynamic information makes it possible to determine the corrosion reactions and the passivable nature of the metal studied. The measurement of the polarization resistance (Rp) is obtained by periodically varying the electric potential in the vicinity of the potential $E_c$ and by measuring the change in the current density which results. The slope of the current/potential curve recorded over this range is inversely proportional to Rp. The greater Rp (expressed in ohm·cm$^2$), the more resistant the material is to corrosion, the rate of degradation being inversely proportional to Rp. The determination of Rp thus makes it possible to evaluate, at least comparatively, the rate of corrosion of the alloys. The results are presented in FIG. 1.

On comparing the data given in table 2 and in FIG. 1, there is observed, for the alloys I1 and I2 according to the invention, a resistance to creep and to oxidation which are significantly improved with respect to the alloy C1 and a resistance to corrosion which is substantially equivalent to that of the alloy C1. The alloy I1, which does not comprise titanium, furthermore shows a substantially better behavior than the alloy I2 with regard to the resistance to oxidation.

The invention claimed is:

1. An alloy, consisting of, as percentage by weight of the alloy:

| | |
|---|---|
| Cr | 20 to 35%; |
| Fe | 10 to 25%; |
| W | 2 to 10%; |
| Nb | 0.5 to 2.5%; |
| Ti | 0 to 1%; |
| C | 0.2 to 1.2%; |

-continued

| | |
|---|---|
| Co | less than 5%; |
| Si | less than 0.9%; |
| Mn | less than 0.9%; | nickel; and
unavoidable impurities.

2. The alloy of claim 1, comprising less than 0.5% by weight of Ti.

3. The alloy of claim 1, comprising no titanium other than in the form of unavoidable impurities.

4. The alloy of claim 1, comprising between 0.7% and 1% by weight of carbon.

5. The alloy of claim 1, having a (Nb+Ti)/C ratio is from 1 to 2.

6. The alloy of claim 1, comprising between 22 and 30% by weight of the chromium.

7. The alloy of claim 1, comprising between 15 and 20% by weight of the iron.

8. The alloy of claim 1, comprising from 0.5 to 2.0% by weight of niobium.

9. The alloy of claim 1, comprising from 3 to 9% by weight of tungsten.

10. The alloy of claim 1, wherein the alloy comprises less than 3% by weight of cobalt.

11. An article suitable for manufacturing mineral wool comprising the alloy of claim 1.

12. The article for the manufacture of mineral wool of claim 11, wherein the alloy is manufactured by founding.

13. The fiberizing spinner of claim 11, wherein the alloy is manufactured by founding.

14. A fiberizing spinner suitable for manufacturing mineral wool made of the alloy of claim 1.

15. A process for manufacturing mineral wool by internal centrifugation, comprising:
   pouring a flow of a molten mineral material comprising the alloy of claim 1 into a fiberizing spinner including a pierced peripheral band, pierced with a multitude of orifices through which filaments of the molten mineral material escape; and
   subsequently drawing the filaments to give wool under the action of a gas,
   wherein a temperature of the mineral material in the spinner is at least 1000° C.

16. The alloy of claim 1, wherein the (Nb+Ti)/C ratio is from 1.5 to 2.

17. The alloy of claim 1, comprising between 23 and 28% by weight of the chromium.

18. The alloy of claim 1, comprising from 0.7 to 1.7% by weight of the niobium.

19. The alloy of claim 1, comprising from 3 to 6% by weight of the tungsten.

20. The alloy of claim 1, comprising less than 1% by weight of the cobalt.

\* \* \* \* \*